(12) United States Patent
Baldor et al.

(10) Patent No.: US 7,555,309 B2
(45) Date of Patent: Jun. 30, 2009

(54) RADIO FREQUENCY ROUTER

(75) Inventors: Daniel Baldor, Toronto (CA); Paolo Pace, Hamilton (CA)

(73) Assignee: Evertz Microsystems Ltd., Burlington (CA)

( * ) Notice: Subject to any disclaimer, the term of this patent is extended or adjusted under 35 U.S.C. 154(b) by 478 days.

(21) Appl. No.: 11/404,759

(22) Filed: Apr. 17, 2006

(65) Prior Publication Data

US 2006/0256766 A1     Nov. 16, 2006

Related U.S. Application Data

(60) Provisional application No. 60/671,468, filed on Apr. 15, 2005.

(51) Int. Cl.
*H04M 1/00* (2006.01)

(52) U.S. Cl. ............... 455/550.1; 455/403; 455/426.1; 455/445; 455/461; 455/500

(58) Field of Classification Search ............ 455/550.1, 455/403, 426.1, 445, 461, 432.1, 554.2, 560
See application file for complete search history.

(56) References Cited

U.S. PATENT DOCUMENTS

| | | | |
|---|---|---|---|
| 6,208,219 B1 * | 3/2001 | Singer ................... | 333/104 |
| 6,639,938 B1 * | 10/2003 | Goyette et al. ........... | 375/132 |
| 6,906,526 B2 * | 6/2005 | Hart et al. ............. | 324/527 |
| 2004/0178801 A1 * | 9/2004 | Hart et al. ............. | 324/637 |
| 2005/0089084 A1 * | 4/2005 | Mahany ................ | 375/130 |
| 2005/0125837 A1 * | 6/2005 | Farmer et al. ............ | 725/105 |
| 2006/0013173 A1 * | 1/2006 | Rinne et al. ............ | 370/338 |

* cited by examiner

*Primary Examiner*—Sharad Rampuria
*Assistant Examiner*—Huy D Nguyen
(74) *Attorney, Agent, or Firm*—Bereskin & Parr LLP/S.E.N.C.R.L., s.r.l.

(57) ABSTRACT

A radio frequency (RF) router is disclosed. The RF router utilizes resistive input signal splitters on an input module to divide input RF signals received at RF signal input terminals into a plurality of backplane signals. The backplane signals are transmitted to one or more output modules where the backplane signals are each resistively split into a plurality of split backplane signals. A split backplane signal corresponding to each of the input RF signal is coupled to a backplane signal selection stage. The backplane signal selection stage couples on of the split backplane signals to an RF signal output terminal.

21 Claims, 8 Drawing Sheets

RADIO FREQUENCY ROUTER

FIELD OF THE INVENTION

This invention relates to routers for radio frequency signals.

BACKGROUND OF THE INVENTION

Radio frequency (RF) signals are commonly switched between source and destination devices using an RF router (or RF routing switcher). The purpose of an m×n RF router is to allow the user to connect RF signals from up to "m" source devices to as many as "n" destination devices. Some devices may be both source and destination devices and may be coupled to both one or more inputs of a RF router and to one or more outputs of the RF router. The variable "m" refers to the number of RF input signals the router can accommodate; "n" refers to the number of outputs the router supports. The number of inputs and outputs that a RF router can handle is often referred to as the size, format or dimension of a router. For example, a router capable of routing 64 inputs to 32 outputs has a size or format of 64×32.

Through a controller (which may be integrated with the router or may be externally coupled to the router), an m×n RF router can be configured to direct any of its m inputs to be routed to any combination of its n outputs. This enables the user to connect RF source devices to the router's inputs, and RF destination devices to the router's outputs, and make and break connections without having to rewire the circuit every time that a new configuration is desired.

RF signals are used to transmit increasingly complex data signals. For example, digital audio/video signals for high definition television contain significantly more information than older forms of RF signals such as AM radio. In addition, many more signals must be processed in modern signal processing systems. In some regions, hundreds of signals are available for viewing or listening. Due to the prevalence of the use of RF signals to transmit data, and the corresponding increase in complexity in RF signal networks, there is a need for m×n RF routers where m and n are equal to greater than 32.

While RF routers with 32 inputs and 32 outputs are known in the art, there are several undesirable features of previous designs. RF routers with high numbers of inputs and outputs typically are physically very large, due to the common practice of using active components to divide incoming signals. The use of a large number of active components increases the amount of energy consumed by a typical router, and simultaneously increases the likelihood of malfunction. Other devices use Wilkinson splitters to divide incoming signals. Wilkinson splitters are also physically large devices and occupy substantial space on a circuit board. As a result, RF routers that utilize Wilkinson splitter are also physically large and have other disadvantages.

RF routers are often designed to fit into a 19 inch wide rack. Such device may have various heights, generally in multiples of rack units (which are 1.75 inches high). The large physical size of the signal splitting devices limits the number of inputs and outputs that can be provided in a standard or practically sized unit. To assemble routers with a larger number of inputs or outputs (or both) than a particular design can provide in a practical size, multiple individual routers are often coupled together, with the result that substantial space is required to provide such routers. Such modular routers require an external active switching component, which requires external control with a correspondingly higher cost and a higher likelihood of malfunction.

Accordingly, there is a need for a large format RF router that is compact, energy-efficient, low-cost and that has a low likelihood of malfunction.

SUMMARY

In one aspect the invention provides a RF router comprising: a controller; one or more input modules, one or more output modules and a backplane.

The input modules include a plurality of RF signal input terminals; a plurality of backplane signal output terminals; and a resistive input signal splitter coupled to each RF signal input terminals for providing a plurality of split input signals, wherein each of the split input signals is coupled to one of the backplane signal output terminals as a backplane signal.

The output modules, wherein each output module includes: a plurality of backplane signal input terminals for receiving at least some of the backplane signals; a resistive backplane signal splitter coupled to each backplane signal input terminal for splitting the corresponding backplane signal into a plurality of split backplane signals; a plurality of RF signal output terminals; a backplane signal selection stage coupled to each of the backplane signal splitters and corresponding to one of the RF signal output terminals for receiving a split backplane signal corresponding to each backplane signal received at the backplane signal input terminals and for selecting one of the split backplane signals in response to a signal from the controller; and a RF signal output stage coupled to each of backplane signal selection stages for receiving the selected split backplane signal and for coupling the selected split backplane plane signal to the one RF signal output terminal as an output RF signal.

The backplane includes a plurality of backplane signal paths, wherein each backplane signal path couples one of the backplane signal output terminals to one of the backplane signal input terminals.

Other embodiments according to this aspect may have at least 32 RF input terminals or at least 32 RF output terminals. Other embodiments may have dimension of at least 32 RF input terminals x at least 32 RF output terminals.

In another aspect, the RF router may have a first group of RF signal input terminals that have a first external signal impedance. The RF router has an internal signal impedance. The input module includes an input signal impedance matching stage coupled between the RF signal input terminals in the first group and the corresponding resistive input signal splitters. Each input signal impedance stage presents the first external impedance to the corresponding RF signal input terminal and the input signal impedance matching stage presents the internal signal impedance to the corresponding resistive input signal splitter.

In another aspect the RF router may have an automatic gain control stage coupled between each input signal impedance matching stage and the corresponding resistive input signal splitter, wherein each automatic gain control stage operates to adjust the gain of the corresponding input RF signal. The automatic gain control stages may operate under the control of the controller.

In another aspect, the RF router's input module may include an equalization stage coupled between at least some of the automatic gain control stages wherein each of the equalization stage is configurable to equalize the input RF signal.

In another aspect, the RF router's input module may include an automatic gain control stage coupled between each RF signal input terminal and the corresponding resistive input signal splitter.

In another aspect, the RF router may comprise a high isolation RF gain stage coupled between each resistive input signal splitter and each corresponding backplane signal output terminal.

In another aspect, an RF router may include a split input signal termination stage coupled between each resistive input signal splitter and each corresponding high isolation RF gain stage, wherein each split input signal termination stage is configurable to operate in a signal flow-through mode in which the split input signal termination stage couples the resistive input signal splitter to the corresponding to high isolation RF gain stage to permit a corresponding split input signal to reach the high isolation RF gain stage or in a signal termination mode in which the corresponding split input signal is terminated to ground through a termination resistor having an impedance equal to the internal signal impedance. The controller may be coupled to each split input signal termination stage to switch the split input signal termination stage between the flow-through mode and the signal termination mode.

In another aspect, the high isolation gain stages may have an on state and an off state. In this aspect, the controller is coupled to each high isolation gain stage to switch the high isolation gain stage to its off state when the corresponding split input signal termination stage is in its signal termination mode and to switch the high isolation gain stage to its on state when the corresponding split input signal termination stage is in its signal flow-through mode.

In another aspect, the controller is configured to switch each split input signal termination stage to its signal flow-through mode when the corresponding backplane signal is coupled to an output module and to switch each split input signal termination stage to its signal termination mode when the corresponding backplane signal is not coupled to an output module.

In another aspect, each of the backplane signal paths has a path length selected to compensate for corresponding differences in a characteristic of a split backplane signals corresponding to the backplane signal path. Alternatively, the split backplane signals may have a path length in the output modules and each of the backplane signal paths has a path length selected to compensate for corresponding differences in the path lengths of the corresponding split backplane signals.

In another aspect, the RF router's backplane may include an input module port for each of the input modules and an output module port for each of the output modules. Each of the input module port includes: an RF signal port associated with each of the RF signal input terminals on the input module associated with the input module port, wherein the RF signal port has an external RF connector for connecting with a source device for an input RF signal and an internal RF connector for coupling with the RF signal input terminal and wherein the RF signal port couples the input RF signal to the RF signal input terminal; and a backplane connector for coupling to the backplane signal output terminals of the input module associated with the input module port, wherein the backplane connector couples each of the backplane signals of the associated input module to a backplane signal path. In another embodiment the output module ports may have a similar structure.

The external RF connector may have an impedance equal to the external signal impedance and the backplane connector may have an impedance equal to the internal signal impedance.

In another embodiment, the backplane signal selection stages of the output module may include a plurality of split backplane termination stages coupled to resistive backplane signal splitter, wherein each of the split backplane termination stages receives one of the split backplane signals; and a RF switch coupled between the backplane termination stages and the RF signal output stage. Each of the split backplane termination stages has a signal flow-through mode and a signal termination mode. The controller is coupled to the split backplane termination stages and to the RF switch to: set the switch to couple the selected split backplane signal to the RF signal output stage; set the split backplane termination stage to corresponding to the particular backplane signal to its signal flow-through mode, wherein the split backplane termination stage couples the selected split backplane signal to the RF switch; and set the remaining split backplane termination stages to their signal termination modes, wherein each of the split backplane termination stages couples its corresponding split backplane signal to ground through a termination resistor having an impedance equal to the internal signal impedance.

In another aspect, the RF signal output stages may include an impedance matching stage that presents the internal signal impedance to the selected split backplane signal and the external signal impedance to the RF signal output terminal or to a circuit element coupled between the impedance matching stage and the RF signal output terminal.

In another aspect, the RF signal output stages may include an output termination stage for selectively terminating the corresponding RF signal output terminal to ground or for coupling the selected split backplane signal to the RF signal output terminal under the control of the controller.

Additional aspects are described below.

BRIEF DESCRIPTION OF THE DRAWINGS

Several examples of the present invention will now be described in detail with reference to the drawings, in which.

DETAILED DESCRIPTION OF EXEMPLARY EMBODIMENTS

Figure 1:
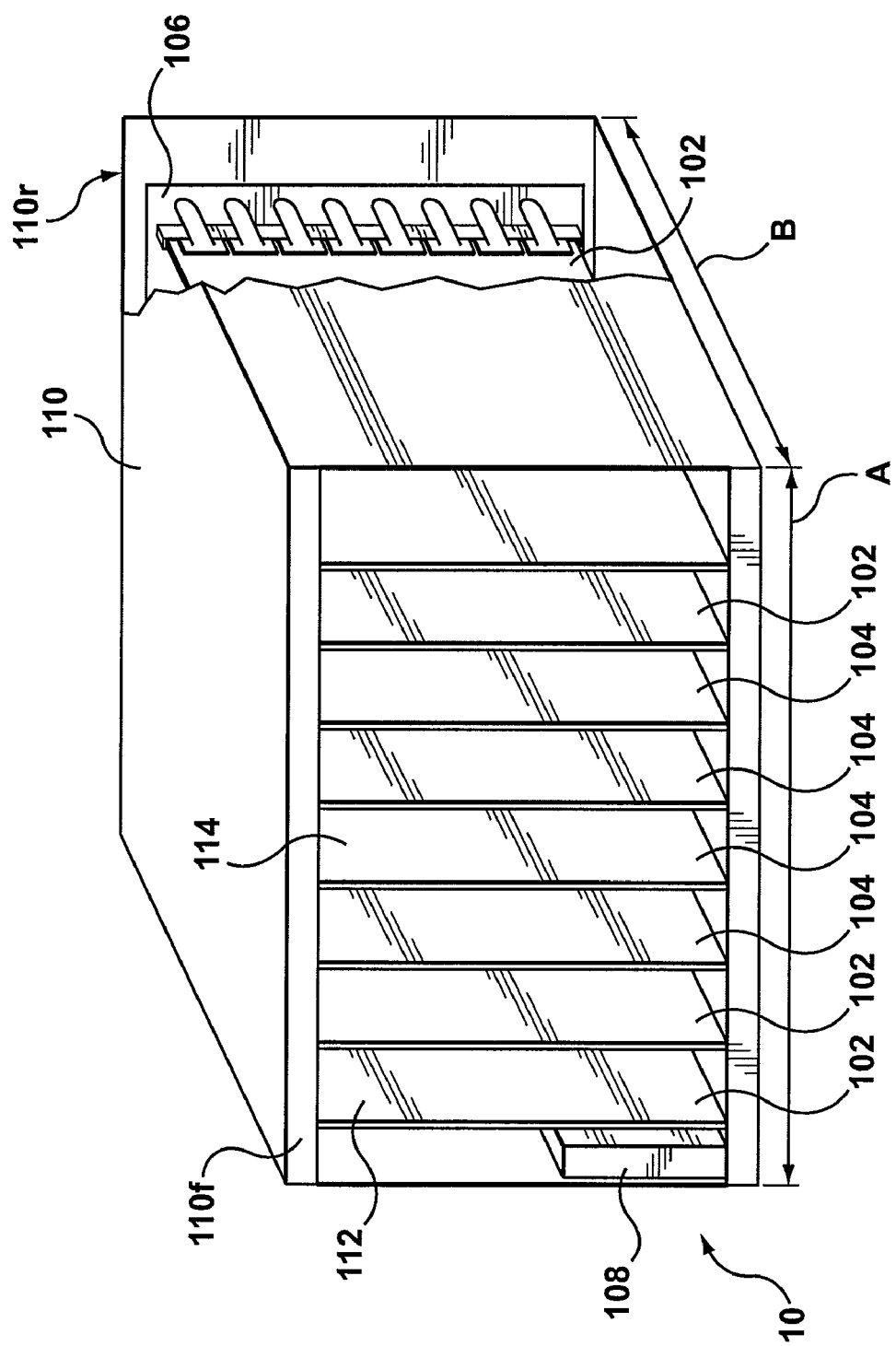
FIG. 1 is a perspective, partial cut-away drawing of an example RF router.
Figure 2:
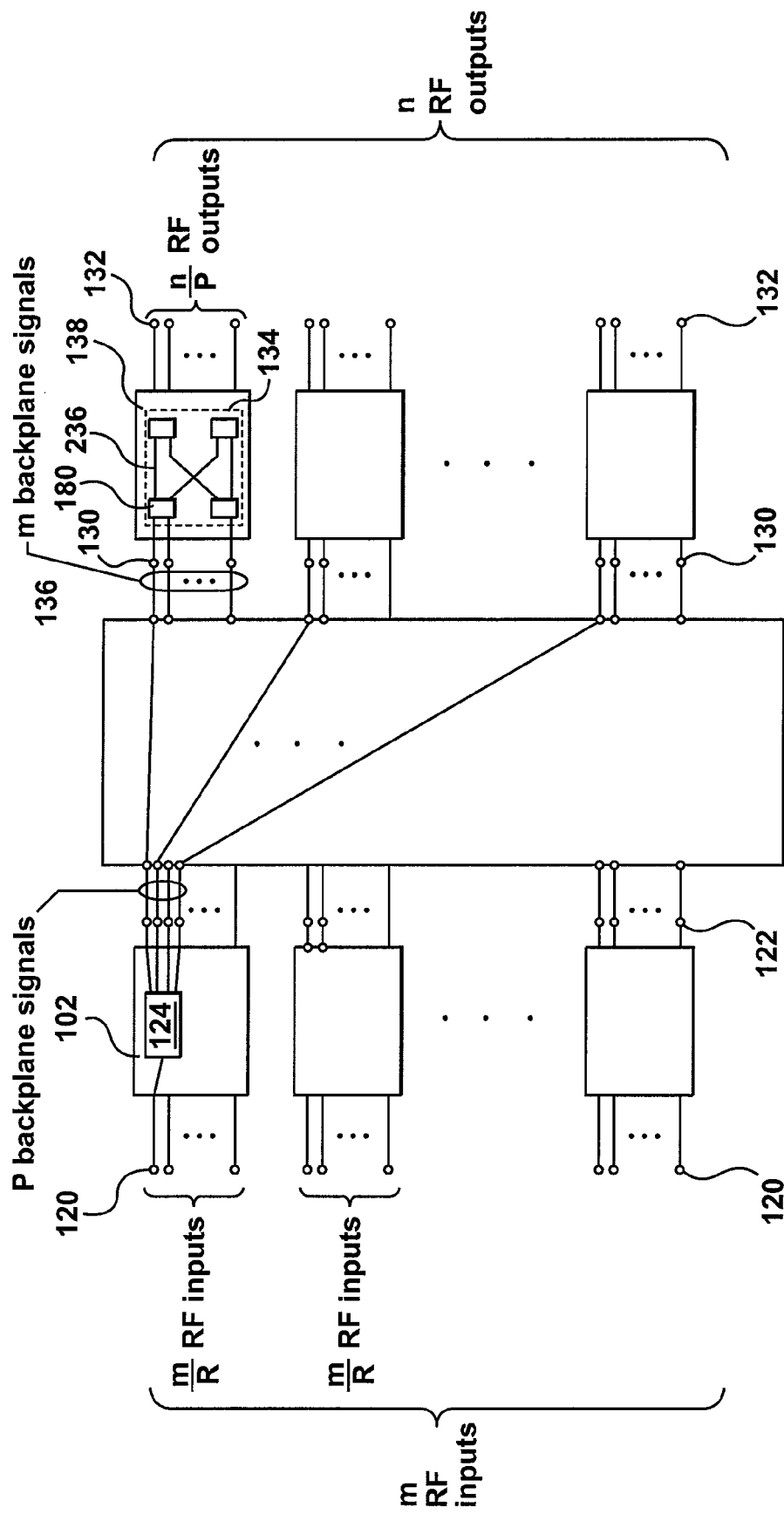
FIG. 2 is a schematic illustration of and example RF router.

Reference is first made to FIGS. 1 and 2. FIG. 1 illustrates a RF router 10 with a dimension of sixty-four RF input terminals×sixty-four RF output terminals. FIG. 2 schematically illustrates a general case of a RF router 100 with a dimension of m RF input terminals×n RF output terminals. RF router 10 is an example of a general case RF router 100.

Router 100 is configured to allow any one of a plurality of input RF signals, each received at one of a plurality of RF signal input terminals to be coupled to any one of any one of a plurality of RF signal output terminals.

Router 100 comprises a plurality of input modules 102, a plurality of output modules 104, a backplane 106 and a controller 108. Input modules 102 and output modules 104 are coupled to the backplane 106, which provides electrical interconnection between the input modules and the output modules. Controller 108 is coupled to various elements of the input modules 102 and output modules 104.

Router 10 has a modular structure and is assembled in a frame or housing 110. In this example, frame 110 is a typical rack mounted frame unit, suitable for mounting in a typical nineteen inch wide rack system. Backplane 106 is mounted at the rear side 110r of frame 110. Frame 110 is configured to receive input modules 102, output cards 104 and controller 108. Each input module is a separate unitary element assembled on an input card 112, which includes a printed circuit board. Similarly, each output module is a separate unitary element assembled as an output card 114, which also includes a printed circuit board. Each input card 112 and each output card 114 can be inserted or removed from frame 110 independently. In other RF routers according to the invention, the components of the RF router may be assembled together in a different type of housing.

In router 100, controller 108 is installed within frame 110. In other embodiments, controller 108 may be provided as an independent device and may be coupled to the input modules and output modules externally. For example, the controller 108 for a router may be mounted in a separate rack mounted frame and may be combined with other devices in that frame. A controller 108 may control other devices in a communication system in addition to RF router 100. Typically, controller 108 will control RF router 100 and such other devices in response to requests or control instructions received from other devices (not shown) or from a user of the RF router or the communication system.

In FIG. 1, router 10 includes four input modules 102. Each input module is configured to receive up to sixteen input RF signals at sixteen RF signal input terminals. Router 100 can thus receive up to 64 input RF signals. Router 100 has sixty-four RF signal output terminals. Any one of the input RF signals may be provided at any one or more of the sixty-four RF signal output terminals as an output RF signal. As is further described below, the input modules 102 and the output modules 104 are configured by controller 106 to interconnect a particular input terminal with one or more particular output terminals. Some of the RF signals received at an input terminal may not be coupled to an RF signal output terminal.

FIG. 2 illustrates the interconnections between the input modules 102, the backplane 106 and the output modules 104 in the general case RF router 100. RF router 100 has a dimension of m RF inputs×n RF outputs. RF router 100 has R input modules and P output modules. In this example, each of the R input modules has an equal number of input terminals and thus has m/R RF signal input terminals 120. Each of the P output modules has an equal number of output terminals and thus has n/P RF signal output terminals 132.

Each input module 102 in RF router 100 includes m/R RF signal input terminals 120. Each input module 102 includes a plurality of backplane signal output terminals 122. Each signal input terminal 120 is coupled to a set of P backplane signal output terminals 122 through an input signal splitting circuit 124. Each input module has a total of m/R×P backplane signal output terminals 122. Between the input modules 102, there is a total of m×P backplane signal output terminals 122.

In router 10, there are four input modules 102. Each of the input modules 102 has sixteen RF input terminals 120 and sixty-four backplane signal output terminals 122. The four input modules 102 have a total of 256 backplane signal output terminals 122.

Each output module 104 in a RF router 100 includes m backplane signal input terminals 130. Between the output modules 104 of a router 100, there are m×P backplane signal input terminals 130, corresponding to the m×P backplane signal output terminals on the input modules 102.

Each output module 104 also has n/P RF signal output terminals 132. The backplane signal input terminals 130 and the RF signal output terminals 132 are coupled through an output signal selection circuit 134. Controller 108 operates the output signal selection circuit 134 to couple one of the m backplane signals received at the backplane signal input terminals 130 to each of the RF signal output terminals 132.

In router 10, each of the four output modules 102 has sixty-four backplane signal input terminals 130 and sixteen RF signal output terminals 132.

The backplane 106 of a router 100 couples the backplane signal output terminals 122 of the input modules to the backplane signal input terminals 130. Each input signal splitting circuit 124 provides n/P backplane signals corresponding to each input RF signal corresponding received at the corresponding RF signal input terminal 120. One of these n/P backplane signals is coupled to a backplane signal input terminal 130 on each of the four output modules through a backplane signal path 136. This provides a backplane signal corresponding to each of the m RF input signal at each output module 104. Through the operation of input of router 100, each RF signal input terminal 120 may be coupled to any one or more of the RF signal output terminals 132.

Figure 3:
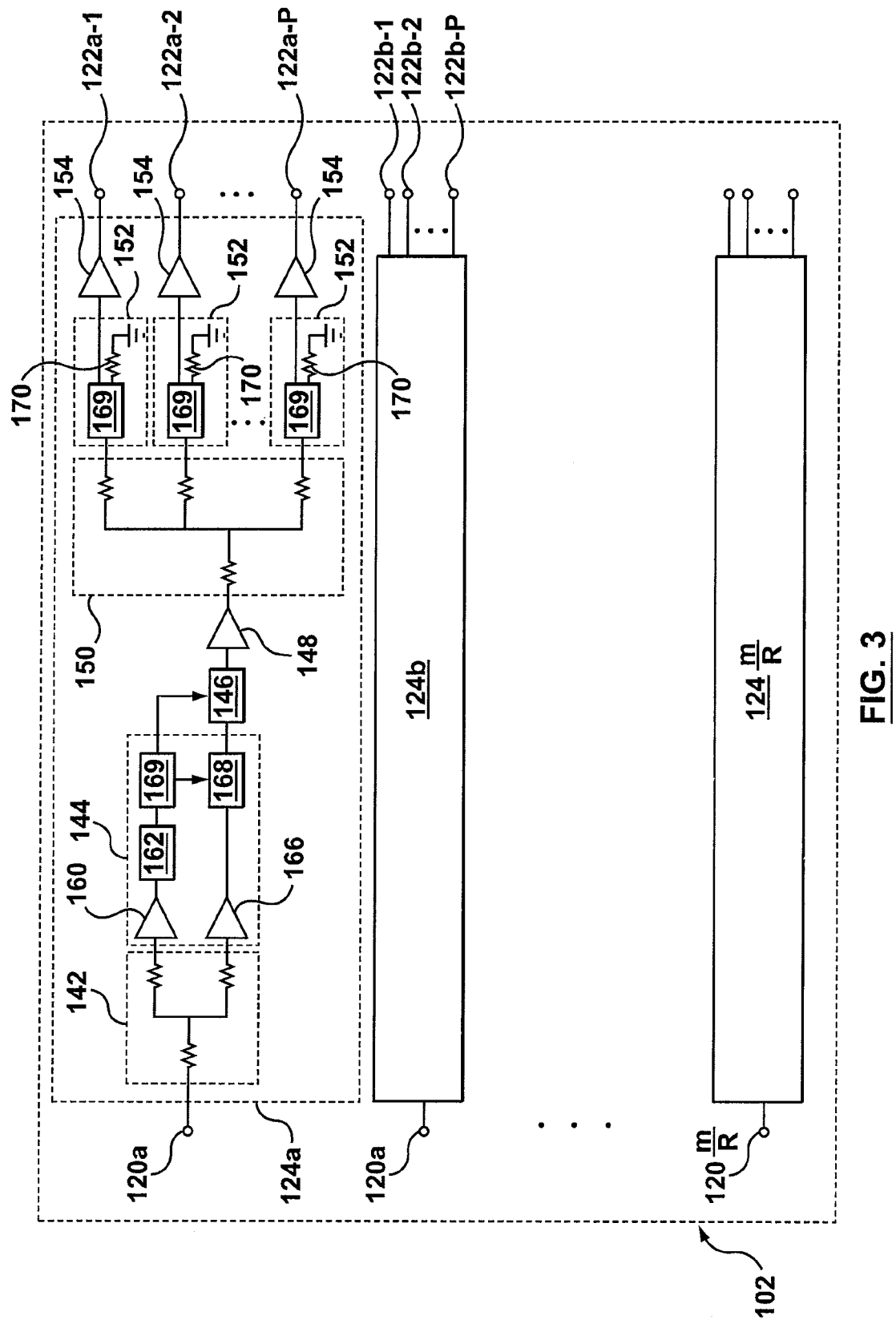
FIG. 3 is a schematic drawing of an input module of the RF router of FIG. 2.

Reference is next made to FIG. 3, which schematically illustrates an input module 102 for the general case of an m×n RF router with R input modules and P output modules. An RF signal input terminal 120a has P corresponding backplane signal output terminals 122a-1, 122a-2, . . . , 122a-P. The RF signal input terminal 120a is coupled to the backplane signal output terminals 122a through an input signal splitting circuit 124a. Similarly each of the m/R RF signal input terminals 120 has a corresponding input signal splitting circuit 124 and a plurality of corresponding backplane signal output terminals 122.

Each input signal splitting circuit 124 includes an impedance matching stage 142, an automatic gain control stage 144, a programmable equalization stage 146, an optional gain stage 148, a 1×P resistive input signal splitter 150, P signal termination stages 152 and P high isolation RF gain stages 154. Each high isolation RF gain stage 154 is coupled to backplane signal output terminal 122.

Each input signal splitting circuit operates as follows.

An input RF signal is received at the corresponding RF signal input terminal 120. In router 100, RF signal input terminals 120 have an external signal impedance selected to be compatible with the device or devices that produce the RF input signals. For example, RF signal input terminals 120 may be coaxial cable terminals and the external signal impedance may be seventy-five ohms, as is typical in many coaxial cable communication systems. In other embodiments, the external signal impedance may be any other impedance suitable for coupling to devices that produces the input RF signals.

The input RF signal is coupled to an input signal impedance matching stage 142. Impedance matching stage 142 has an input impedance that matches the external signal impedance and an output impedance that matches an internal signal impedance. The internal signal impedance may be selected based on the impedance characteristics of the backplane signal output terminals 122 or any other characteristics of the router 100, such as the signal transmission characteristics of the input modules 102, the output modules 104 or the backplane 106 or any combination of these. For example, if the backplane signal output terminals have an impedance of fifty ohms, the internal signal impedance may be selected to be fifty ohms.

The impedance matching stage 142 provides two signals corresponding to the input RF signal to the automatic gain control stage 144. Automatic gain control stage 144 includes an RF signal flow path and a signal analysis path.

The signal analysis path includes a signal amplifier 160, a signal power meter 162 and a controller 164, which may be a microprocessor, microcontroller or other type of control device. Signal amplifier 160 receives a signal corresponding to the RF signal from the impedance matching stage 142 and amplifies this signal. The amplified signal is analyzed by signal power meter 162, which provides a signal corresponding to the power level of the RF input signal to controller 164. Controller 164 generates an attenuation control signal. Controller 108 is coupled to controller 164 and may control the generation of the attenuation control signal. Controller 164 may generate the attenuation control signal based on a desired signal power level set by controller 108 or based another desired signal power level. Controller 164 generates the attenuation control signal such that the controlled gain signal has a power signal suitable for processing in the equalization stage 146, gain stage 148 and the subsequent components of the input module 102.

The signal flow path includes an amplifier 166 and a signal attenuator 168. Amplifier 166 receives a signal corresponding to the input RF signal from the impedance matching stage 142 and amplifies this signal. Signal attenuator 168 receives the amplified signal and the attenuation control signal. Signal attenuator 168 attenuates the amplified signal in response the attenuation control signal to provide a controlled gain signal corresponding to the RF input signal.

The controlled gain signal is received by equalization stage 146. Controller 164 also generates an equalization control signal that is coupled to the equalization stage 146. The equalization stage 146 processes the controlled gain signal to provide an equalized signal in response to the equalization control signal. Controller 108 may control the generation of the equalization control signal by controller 164.

The equalized signal is amplified by gain stage 148 and the resulting amplified equalized signal is received by the 1×P input signal splitter 150. Input signal splitter 150 splits the amplified equalized signal to produce P split input signals corresponding to the input RF signal received at the corresponding RF signal input terminal 120.

Each split input signal is received by a backplane signal termination stage 152. Each signal terminal stage 152 includes a 1×2 switch 169 and a termination resistor 170. Each signal termination stage 152 is controlled by controller 108 and operates in one of two modes. In a signal flow-through mode, the signal termination stage 152 couples the split input signal to a high isolation RF gain stage 154. In a signal termination mode, the signal termination stage 152 couples the split input signal to ground through a terminating resistor 170. The terminating resistor 170 has an impedance corresponding to the internal signal impedance. Signal termination stage 152 is operated in the signal flow-through mode if the split input signal is coupled to an output module through the backplane 106. If the split input signal is not coupled to an output module, the signal termination stage 152 operates in the signal termination mode to reduce reflection of unterminated split input signals and to reduce degradation of any split input signals that are coupled to output modules.

Controller 108 switches each of the switches 170 to set the signal termination stages 152 between the signal flow-through and the signal termination modes depending on whether the corresponding split input signal is coupled to an output module. It is possible that a split input signal is not coupled to an output module 104 if the output module 104 is missing, malfunctioning or if the input modules 102 provide more backplane signals than can be received by the output modules 104 in a particular router. For example, if the user of a particular router configured to have up to 128 RF signal input terminals and up to 128 RF signal output terminals by using eight output modules that have 16 RF signal output terminals each, determines that only 80 or fewer of the RF signal output terminals are required, the user may purchase only five output modules, or may remove the excess output modules. The input modules will typically be configured to provide eight split input signals corresponding to each RF signal received at any RF signal input terminal 120. The split input signals that are not coupled to an output module are terminated in a signal termination stage 152. Controller 108 is coupled to detection and sensing devices (not shown) that allow controller 108 to monitor to operation and structure of router 100. Controller 108 operates router 108 partly in response to the information it receives from these devices.

The high isolation RF gain stages 154 have an on state and on off state. Controller 108 is coupled to the high isolation RF gain stages 154 to switch them between the on and off states.

When the corresponding signal termination stage is operating its signal flow-through mode, each high isolation RF gain stage 154 is set to its on state and receives and amplifies a split input signal to provide a backplane signal at a backplane signal output terminal 122. The high isolation RF gain stage 154 isolates the forward path of the backplane signal (through the backplane) from the reverse path, thereby reducing potential interference from internal reflections in the input module. The RF gain stage 154 has an output impedance closely matched to the impedance of the backplane signal paths 135 (FIG. 2), which operate and router's internal signal impedance. One of the P backplane signals corresponding to each of the RF input signals received at the input modules m/R RF signal input terminals 120 is couple to a backplane signal input terminal 130 on each of the output modules 104. The use of the impedance RF gain stages reduces reflections and signal degradation of the input signals through the input module by terminating the backplane signals.

When the corresponding signal termination stage is operating in its signal termination mode, each high isolation RF gain stage 154 is set to its off state. This reduces the power consumed by the RF router 104.

It is optional to use high isolation RF gain stages with on and off states. In an alternative embodiment, the high isolation RF gain stages may be operation at all times.

FIG. 3 illustrates a typical input module 102. Several components of the input signal splitting circuit 124 are optional.

If the external signal impedance and the internal signal impedance are equal, then the impedance matching stage 142 is not configured to match impedances. Stage 142 may simply split the incoming RF signal to provide two corresponding signals for the signal flow path 156 and the signal analysis path 158 of the automatic gain control stage 144.

The automatic gain stages 144 are required in part to compensate for the different power levels of different input RF signals received at the various RF signal input terminals 120. If a router is used in an environment where all input RF signals have an appropriate power level, automatic gain stages 144 may not be required.

Similarly, equalization stages may be omitted if it is not desired to equalize or further process the controlled gain signal produced by the automatic gain stages 144.

In a router in which all split input signals produced by the resistive input signal splitters 150 are coupled to output modules, the signal termination stages 152 may be omitted. Such a RF router may not be a modular embodiment but may rather be a fixed configuration embodiment in which the input and output modules are not intended to be removed while the RF router is in operation.

Figure 4:
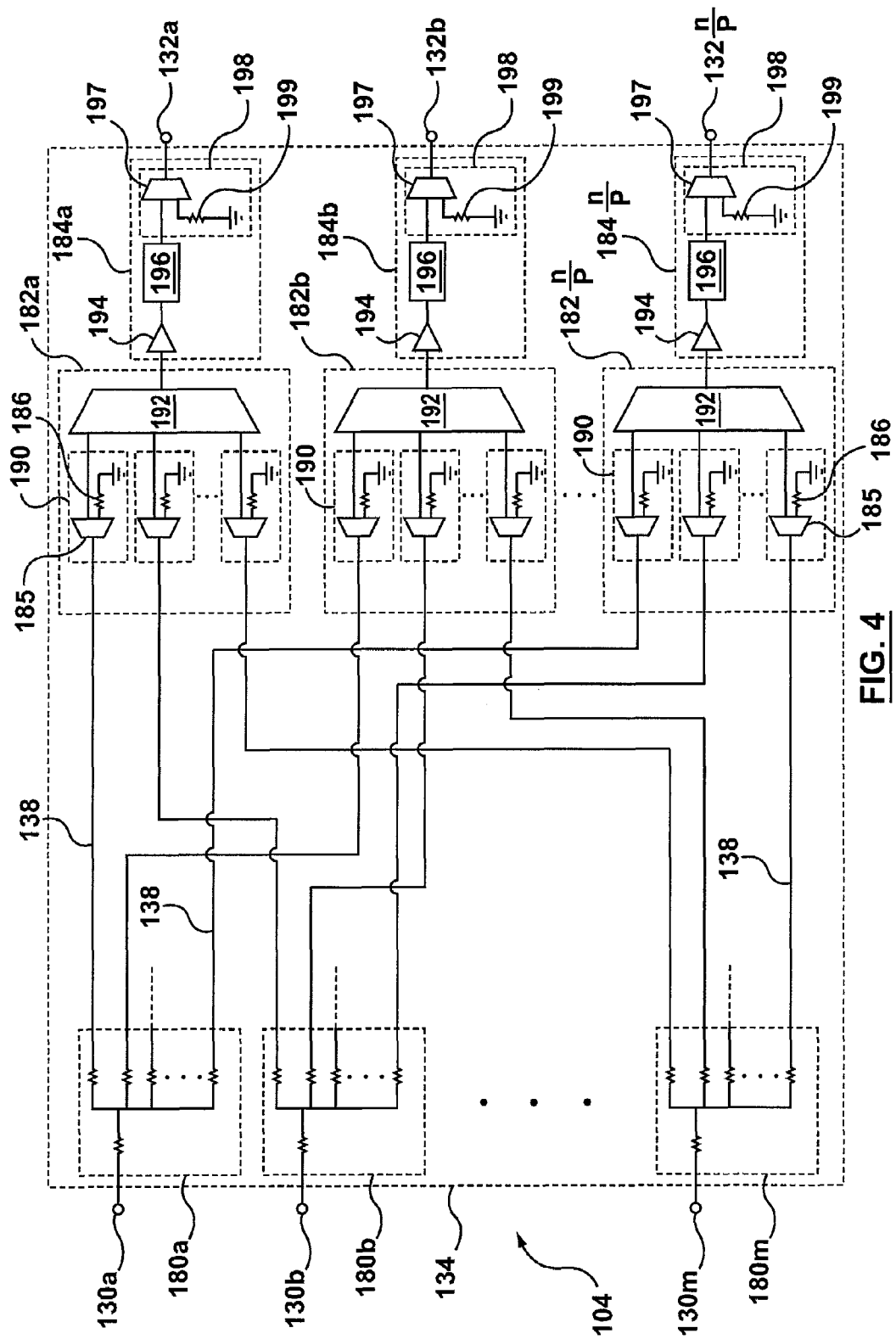
FIG. 4 is a schematic drawing of an output module of the RF router of FIG. 2.

Reference is next made to FIG. 4, which schematically illustrates an output module 104 for the general case of an m×n RF router with R input modules and P output modules. The output signal selection circuit 134 includes m backplane signal splitters 180, n/P backplane signal selection stages 182 and n/P RF signal output stages 184 coupled between the backplane signal input terminals 130 and the RF signal output terminals 132. Each backplane signal input terminal 130 has a backplane signal splitter 180 associated with it. Each RF signal output terminal 132 has an backplane signal selection stage 182 and a RF signal output stage associated with it.

Each backplane signal input terminal 130 is coupled to a resistive backplane signal splitter 180. Each backplane signal splitter 180 splits the backplane signal received at the corresponding backplane signal input terminal 130 into n/P corresponding split backplane signals. One of these split backplane signals is coupled to each backplane signal selection stage 182. In this way, each backplane signal selection stage 182 receives a split backplane signal corresponding to every input RF signal received at the RF signal input terminals 120 of the input modules 102.

m×n/P split backplane signals are created by the m backplane signal splitter on the output module 102. In the example of FIG. 1, in which the router 100 has a dimension of sixty-four input RF signals×sixty-four output RF signals, four input modules each having sixteen RF signal input terminals and four output modules each having sixteen RF signal output terminals, 1024 split backplane signals are created. Each of these split backplane signals corresponds to an input RF signal.

Each backplane signal selection stage 182 includes m split backplane signal termination stages 190 and an m×1 RF switch 192.

Each split backplane signal termination stage 190 includes a 1×2 switch 185 and a termination resistor 186. The split backplane signal termination stage 190 receives one of the m split backplane signals coupled to the backplane signal selection stage 182. Each split backplane signal termination stage 190 has a signal flow-through mode and a signal termination mode. In the signal flow-through mode, controller 108 sets switch 185 to couple the corresponding split backplane signal to the corresponding RF switch 192. In the signal termination mode, controller 108 sets switch 185 to couple the corresponding split backplane signal to ground through a termination resistor 186. The termination resistor 186 is selected to match the internal signal impedance of router 100.

RF switch 192 is coupled to m corresponding split backplane signal termination stages 190. RF switch 192 is capable of coupling any one of the m signals received from the split backplane signal termination stages to the RF signal output stage 184.

The split backplane signal termination stages 190 and the RF switch 192 operate under the control of controller 108. During operation of router 100, controller 108 sets one of the split backplane signal termination stages 190 in each backplane signal selection stage 182 to its signal flow-through mode. All of the other split backplane signal termination stages 190 are set to their signal termination modes. As a result, only one of the split backplane signals is coupled to the RF switch 192. Controller 108 sets the RF switch 192 to couple this split backplane signal to the RF signal output stage 184. The particular split backplane signal coupled to the RF signal output stage 184 is determined by signals received by the controller 108.

The split backplane signal termination stages 190 are optional. The RF switch 192 in each backplane signal selection stage 182 will typically be capable of selecting only one of the m split backplane signals and coupling only that signal to the RF signal output stage 184. The use of the split backplane signal termination stages 190 reduces reflections of the split backplane signals that are not coupled through the RF signal to the output module 104 and other parts of router 100.

Each RF signal output stage 184 includes an RF output signal gain stage 194, an output signal impedance matching stage 196 and an output termination stage 198. The split backplane signal coupled through by the corresponding backplane signal selection stage 182 is amplified by the RF output signal gain stage 194 to produce an amplified backplane signal. The amplified backplane signal passes through an impedance matching stage 196 that has an input impedance corresponding to the internal signal impedance of the router 100 and an output impedance corresponding to the external signal impedance to produce an output RF signal at the external signal impedance.

Output termination stage 198 includes a 2×1 switch 197 and can operate in a signal flow-through mode or in an output termination mode. In the signal flow-through mode, the output termination stage couples the output RF signal to the corresponding RF signal output terminal. In the output termination mode, the output termination stage 198 couples the RF signal output terminal to ground through a termination resistor 199 corresponding to the external signal impedance. Output termination stage 198 operates under the control of controller 108. If an output device is coupled to the output RF signal terminal 132 to receive at output RF signal, the output termination stage is operated in its signal flow-through mode. Otherwise, the output termination stage 198 is operated in its output termination mode.

Figure 5:
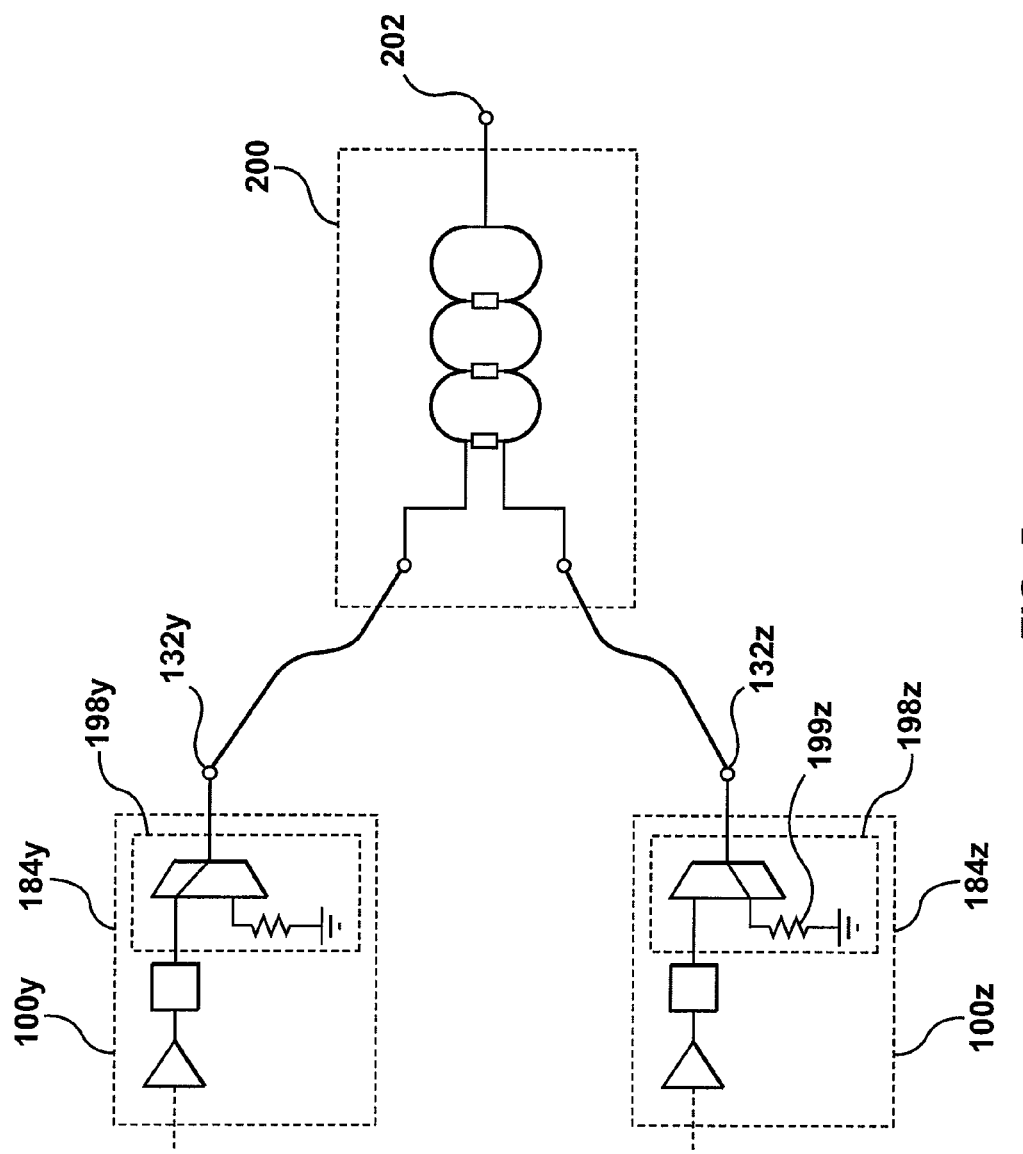
FIG. 5 is a schematic illustration of two output terminals of two RF routers coupled together.

Reference is next made to FIG. 5, which illustrates a use of output termination stage 198. In some RF signal processing systems, it may be desirable to combine two RF signal output terminals from two different routers. FIG. 5 illustrates an RF signal output stage 184$y$ that is part of a first router 100$y$ and a second RF signal output stage 184$z$ that is part of a second router 100$z$. RF signal output terminals 132$y$ and 132$z$ are combined using a passive RF combiner 200. In use, controller 108 controls both routers 100$y$ and 100$z$, or at least controls the operation of both output termination stages 198$y$ and 198$z$. One of the output termination stages is set to the signal flow-through mode and the other output termination stage is set to the output termination mode. In FIG. 5, output termination stage 198$y$ is in the signal flow-through mode and output termination stage 198$z$ is in the output termination mode. The passive RF combiner 200 thus sees an output RF signal at RF signal output terminal 132$y$, at the external signal impedance provided by the impedance matching stage 196$y$. The passive RF combiner 200 sees no signal at RF signal output terminal 132$z$ and sees the external signal impedance provided by the termination resistor 199z. The passive RF combiner provides the output RF signal seen at RF signal output terminal 132y at its output terminal 202. The use of output termination stages 198 thus allows the use of passive RF combiners (or other RF signal combining elements) to be coupled to two RF signal output terminals 132, typically from two different routers. This allows the number of input signals that may be processed by the two routers and provided at a common set of output terminals (i.e. the output terminals of the RF combiners) to be increased. For example, if routers 100y and 100z have a dimension of m×n and if only n RF signal output terminals are required at in a particular system, then passive RF combiners may be use to combined the RF signal output terminals to allow the two routers to process up to 2m input RF signals. It is not necessary that the two routers have the same number of RF signal output terminals or that all of the RF signal output terminals on a router be combined with other RF signal outputs. Any number of the RF signal output terminals on the two routers may be combined using passive RF combiners to increase the number of input signals that be processed by the combination of the two routers.

Figure 6:
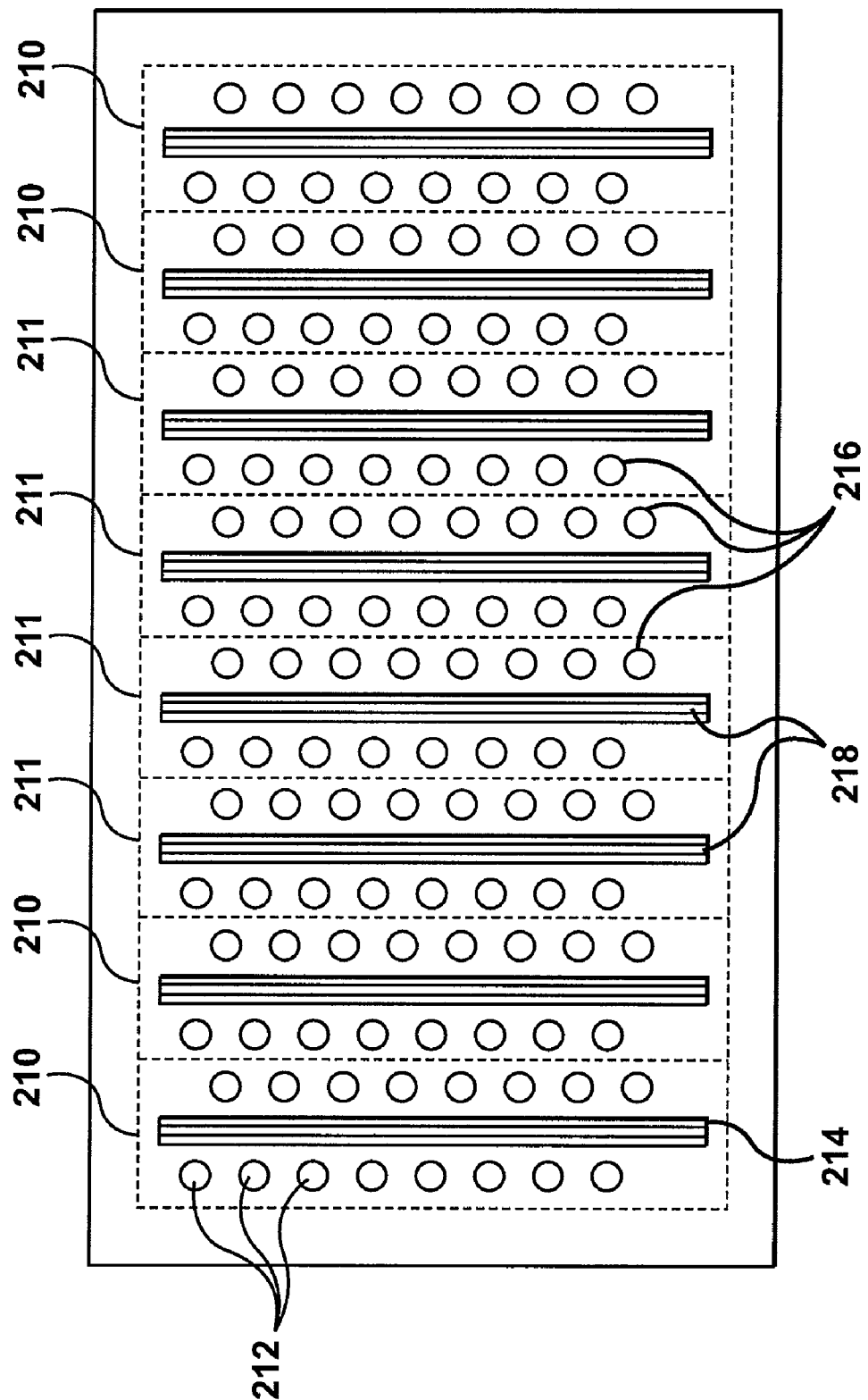
FIG. 6 is a drawing of a backplane of the RF router of FIG. 1.
Figure 7:
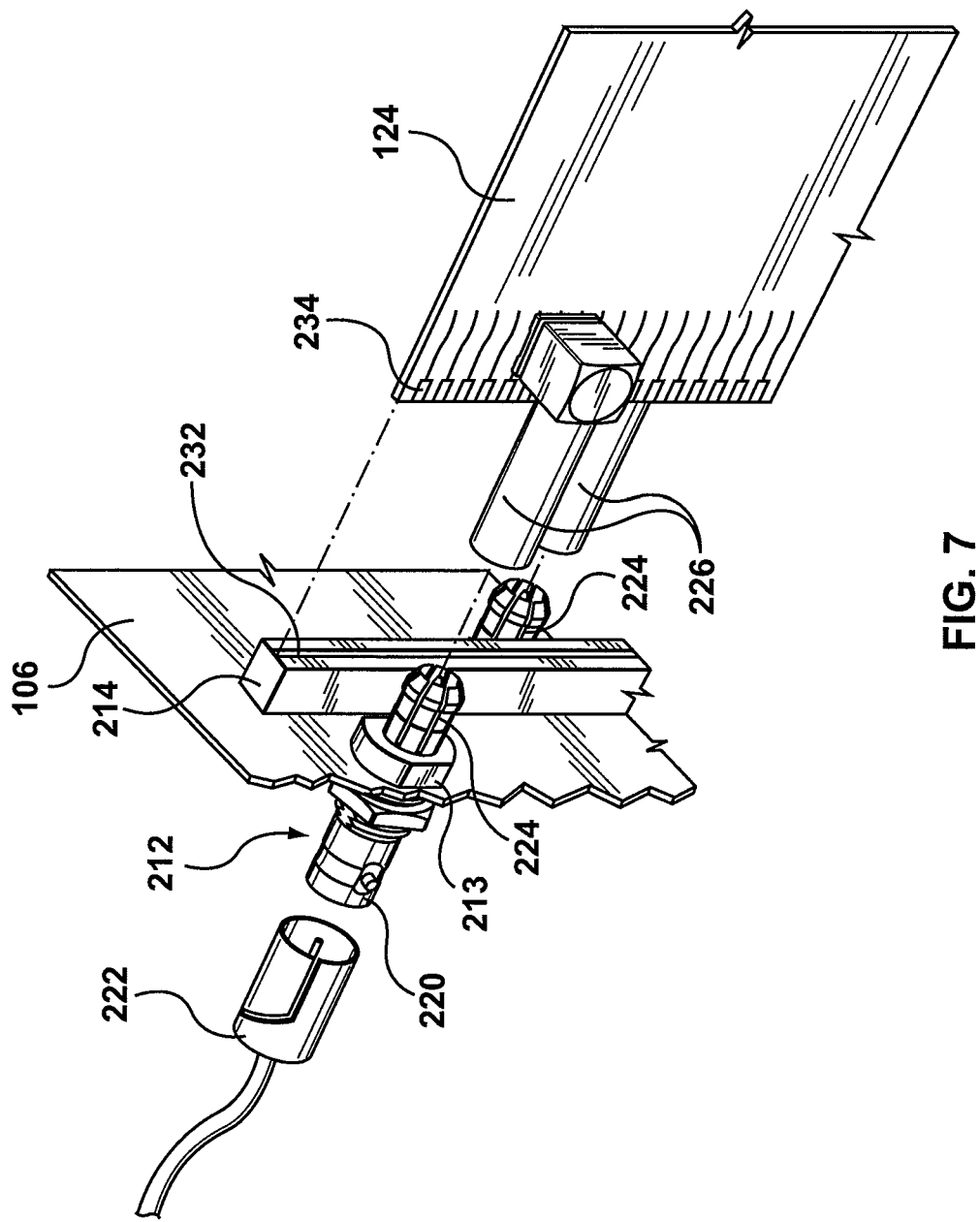
FIG. 7 is a perspective drawing of a part of the backplane of FIG. 6 and related components.

Reference is next made to FIGS. 6 and 7. FIG. 6 diagrammatically illustrates backplane 106 as viewed from its front side (i.e. from the front 110f of frame 110 in FIG. 1). FIG. 7 illustrates several connectors on the backplane 106 and an input module 102 in greater detail. Backplane 106 has a plurality of input module ports 210 and a plurality of output module ports 211.

Each input module port 210 includes a plurality of input RF signal connectors 212 and a backplane signal connector 214. Similarly, each output module port includes a plurality of output RF signal connectors 216 and a backplane signal connector 218.

The input RF signal connectors 212 are mounted through apertures 213 in the backplane. The input RF signal connectors 212 have an external co-axial cable jack or connector 220 that is designed to be coupled a coaxial cable 222 at the rear or external side of backplane 106. The input RF connectors 212 have an internal push-on coaxial connector 224 at the front side of backplane 106. Input modules 106 are built on printed circuit boards that plug into the frame 110 (FIG. 1). Each RF signal input terminal 120 is a push-on co-axial connector 226 that mates with the connector 224. An input RF signal is received from the coaxial cable 222, through the co-axial cable connector 222, push-on connector 224 and through push-on connector 226 and is coupled to an input signal splitting circuit 124 (FIG. 2). In router 10, the input modules have eight push-on connectors 226 on each side of the input module. Each input module port 210 includes sixteen input RF connectors 224 positioned to mate with the push-on connectors 226.

The backplane signal connector 218 is a stripline or card edge type connector 232. Input module 124 has a series of connection pads or fingers 234 printed on it. These connection pads 234 are the backplane signal output terminals 122. When the input module 124 is inserted into frame 110, the connection pads 234 mate with the card edge connector 232. The card edge connector 232 couples each connection pad to a backplane signal path 136.

In router 10, the output module ports 212 are identical to the input module ports 210. The output RF signal connectors 216 are identical to the input RF signal connectors 212. The backplane signal connectors 218 are identical to the backplane signal connectors 214. The output modules similarly have push-on connectors 226 and connection pads 234 allowing the output modules to be installed in the frame 10 and onto the backplane 106 by pushing them into place from the front of the frame 10.

The use of the RF signal connectors 212 allows the input modules 124 to be removed from frame 124 is disengaged from the backplane 106 without physically removing the coaxial cables 222 from the RF signal connectors 212. The input modules 124 may thus be conveniently removed for repair or replacement, or if they are not required in a particular application of the router 10. The output modules can similarly be conveniently removed and installed into frame 110.

Figure 8:
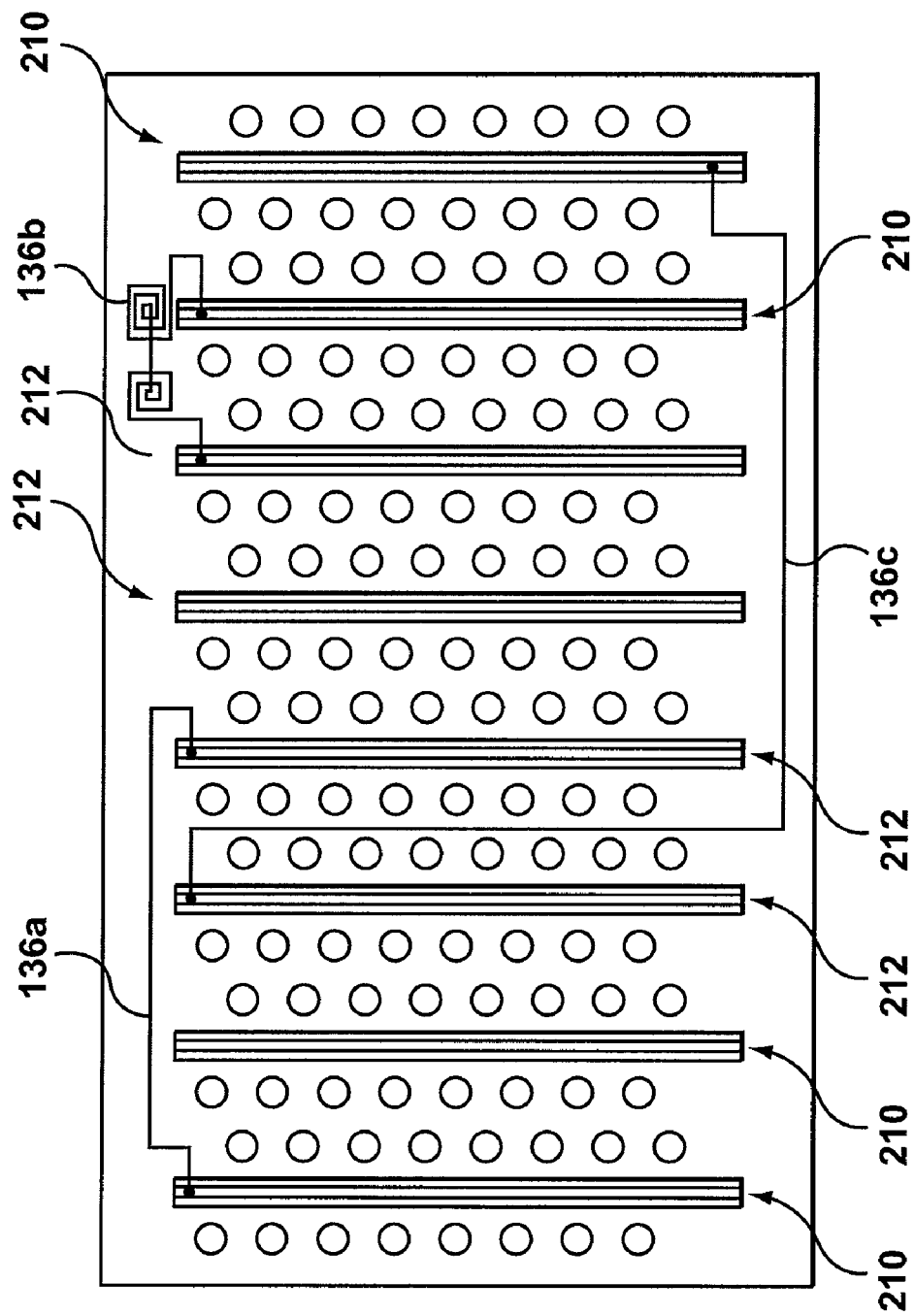
FIG. 8 illustrates several backplane signal paths on the backplane of FIG. 6.

Reference is next made to FIG. 8 which illustrates several backplane signal paths 136 on backplane 106. In a router with m RF signal input terminals and P output modules, the backplane 106 contains m×P backplane signal paths 136. Several backplane signal paths 136a, 136b and 136c are illustrated in FIG. 8.

Referring briefly to FIG. 4, each of the output modules has m×n/P split backplane signals running. Each of these split backplane signals runs in a separate split backplane signal path 138 on the output modules. In router 10, each output module has 1024 split backplane signal paths. To facilitate this number of split backplane signal paths, output module 104 will typically be built on a multi-layer circuit board and the lengths of the various split backplane signal paths 138 will typically be different.

Reference is again made to FIG. 2. The signal path of an input RF signal received at an RF signal input terminal 120 and which is eventually provided as an output RF signal at an RF signal output terminal 132 proceeds through: an input signal splitting circuit 124; a backplane signal path 136; a resistive backplane signal splitter 180; a split backplane signal path 138; an backplane signal selection stage 182; and a RF signal output stage 184. The lengths of different signal paths for a single input RF signal coupled to two different RF signal output terminals 132 may be sufficiently different that the two resulting output RF signals are noticeably out of synchronization with one another. For example, if the input RF signal is an L-Band video signal, then the display of the resulting output RF signals may exhibit a noticeable or measurable time delay between them.

Reference is again made to FIG. 8. To compensate for the possible lack of synchronization of output RF signals originating from the same input RF signal, the length of the backplane signal paths 136 between particular backplane signal input terminals 122 and backplane signal output terminals 130 is selected to substantially equalize the total signal path length from each RF signal input terminal 120 to each RF signal output terminal 132. For example, the length of backplane signal path 136a is shorter than the length of backplane signal path 136c to compensate for a longer total signal path length for RF signals utilizing the two paths. Similarly, the path length of backplane signal path 136b is lengthened by taking a very indirect rout between the backplane signal input terminal at which it begins and the backplane signal output terminal at which it ends. To facilitate the backplane signal paths 236 that may be required, backplane 106 may be (and will typically be) implemented as a multi-layer circuit board. One backplane built by the inventors utilizes four circuit layers separated by interspersed ground layers to enhance signal separation. Other backplanes may use any number of signal layers to provide the backplane signal paths 136.

Router 10 is a specific example of the general case of router 100. Router 100 itself is only an example of an RF router according to the invention. Router 10 has been described as having a dimension of sixty-four inputs x sixty-four outputs. Other routers according to the invention may have a smaller dimension. While the invention is useful with routers as small as four input×four outputs, it is particularly useful for routers having thirty-two or more inputs or having thirty-two or more outputs. Router 100 uses resistive splitters to split the input RF signals and backplane signals. The use of resistive splitters allows router 100 to operate at a wide range of frequencies. An RF router according to the invention may be able to operate with both very low frequencies in the kHz and low mHz range while also be able to operate with L-Band and higher frequency RF signals in the GHz and tens of GHz range.

Connections between the controller 106 and the input modules 102 and output modules 104 have not been illustrated. The controller 106 may be coupled to the input and output modules in any practical manner. For example, the controller may be coupled to the input and output modules through the backplane and the card edge connectors used to couple backplane signals from and to the input and output modules. Alternatively, the controller 108 may be coupled to the input and output modules through a different connection. The controller 108 may be a distributed device and parts of the controller may be built onto the printed circuit boards on which the input or output modules are built. Controller 108 may be part of a larger control system that controls the operation of multiple devices in a communication system. Controller 108 may operate router 100 based on control information and instructions received from a user of the router 100 or from a master controller or both. As noted above, controller 108 may be coupled to detection and sensing devices (not shown) that allow controller 108 to monitor to operation and structure of router 100. Controller 108 operates router 108 partly in response to information it receives from these devices and in response to user controls received at a user interface to the controller 108 or the master controller.

Router 10 and router 100 have been described as having identical input modules and identical output modules. This is not necessary. For example, a router that requires forty RF signal input terminals may be provided with two input modules having sixteen RF signal input terminals and one input module having eight RF signal input terminals. If the same RF router requires eighty RF signal output terminals, it may be provided with five output modules having sixteen RF signal output terminals each or any combination of output modules that have at least eighty RF signal output terminals. If the RF router is to be used in an environment where different communication lines operate at different impedances, then some of the input modules may be configured to operate at correspondingly different external signal impedances. Optionally, different RF signal input terminals on a signal RF signal input module may have impedance matching stages 142 that operate with different external signal impedances. Similarly, different output modules or different RF signal input terminals may operate with different external signal impedances.

The RF signal connectors 212 (FIG. 7) have been described as having a co-axial signal connector on the rear side of backplane 106. In another embodiment, the RF signal connectors may have another type of connector suitable for coupling with the cables in a communication system. A router may be equipped with different types of RF signal connectors to couple with different types of cable and jacks.

The RF signal connectors 212 have also been described as having push-on connectors for mating with the RF signal input and output terminals on the input and output modules. In another embodiment, RF signal connector may be affixed to the input and output modules and may be accessible at the rear side of frame 110 through apertures in the backplane 106. While this may require disconnection of cables from the input modules, this may be acceptable in an embodiment where the input and output modules are not intended to be removed by a user or are not designed to be removed except for repair.

The present invention has been described here by way of example only. Various modification and variations may be made to these exemplary embodiments without departing from the spirit and scope of the invention, which is limited only by the appended claims.

We claim:
1. A RF router comprising:
(a) a controller;
(b) one or more input modules, wherein each input module includes:
   (i) a plurality of RF signal input terminals;
   (ii) a plurality of backplane signal output terminals; and
   (ii) a resistive input signal splitter coupled to each RF signal input terminals for providing a plurality of split input signals, wherein each of the split input signals is coupled to one of the backplane signal output terminals as a backplane signal;
(c) one or more output modules, wherein each output module includes:
   (i) a plurality of backplane signal input terminals for receiving at least some of the backplane signals;
   (ii) a resistive backplane signal splitter coupled to each backplane signal input terminal for splitting the corresponding backplane signal into a plurality of split backplane signals;
   (iii) a plurality of RF signal output terminals;
   (iv) a backplane signal selection stage coupled to each of the backplane signal splitters and corresponding to one of the RF signal output terminals for receiving a split backplane signal corresponding to each backplane signal received at the backplane signal input terminals and for selecting one of the split backplane signals in response to a signal from the controller; and
   (iv) a RF signal output stage coupled to each of backplane signal selection stages for receiving the selected split backplane signal and for coupling the selected split backplane plane signal to the one RF signal output terminal as an output RF signal; and
(d) a backplane including:
   (i) a plurality of backplane signal paths, wherein each backplane signal path couples one of the backplane signal output terminals to one of the backplane signal input terminals.

2. The RF router of claim 1 wherein the RF router has at least 32 RF input terminals.

3. The RF router of claim 1 wherein the RF router has at least 32 RF output terminals.

4. The RF router of claim 1 wherein the RF router has at least 32 RF input terminals and at least 32 RF output terminals.

5. The RF router of claim 4 wherein a first group of the RF signal input terminals has a first external signal impedance and wherein the router has an internal signal impedance and wherein the input module further includes an input signal impedance matching stage coupled between the RF signal input terminals in the first group and the corresponding resistive input signal splitters, wherein the input signal impedance stage presents the first external impedance to the corresponding RF signal input terminal and the input signal impedance matching stage presents the internal signal impedance to the corresponding resistive input signal splitter.

6. The RF router of claim 5 wherein a second group of the RF input terminals has a second external signal impedance and wherein the input module further includes in input signal matching stage coupled the RF signal input terminals in the second group and the corresponding resistive input signal splitters, wherein the input signal impedance stage presents the second external impedance to the corresponding RF signal input terminal and the input signal impedance matching stage presents the internal signal impedance to the corresponding resistive input signal splitter.

7. The RF router of claim 5 wherein the input module further comprises an automatic gain control stage coupled between each input signal impedance matching stage and the corresponding resistive input signal splitter, wherein each automatic gain control stage operates to adjust the gain of the corresponding input RF signal.

8. The RF router of claim 7 wherein the input module further comprises an equalization stage coupled between at least some of the automatic gain control stages wherein each of the equalization stage is configurable to equalize the input RF signal.

9. The RF router of claim 5 wherein the backplane includes an input module port for each of the input modules and an output module port for each of the output modules, wherein each input module port includes:
  (i) an RF signal port associated with each of the RF signal input terminals on the input module associated with the input module port, wherein the RF signal port has an external RF connector for connecting with a source device for an input RF signal and an internal RF connector for coupling with the RF signal input terminal and wherein the RF signal port couples the input RF signal to the RF signal input terminal; and
  (ii) a backplane connector for coupling to the backplane signal output terminals of the input module associated with the input module port, wherein the backplane connector couples each of the backplane signals of the associated input module to a backplane signal path.

10. The RF router of claim 9 wherein the external RF connector has an impedance equal to the external signal impedance and wherein the backplane connector has an impedance equal to the internal signal impedance.

11. The RF router of claim 5 wherein each of the backplane signal selection stages includes:
  (i) a plurality of split backplane termination stages coupled to the resistive backplane signal splitter, wherein each of the split backplane termination stages receives one of the split backplane signals;
  (ii) a RF switch coupled between the backplane termination stages and the RF signal output stage, and wherein the each of the split backplane termination stages has a signal flow-through mode and a signal termination mode, and wherein the controller is coupled to each of the split backplane termination stages and to the RF switch to:
  (iii) set the switch to couple the selected split backplane signal to the RF signal output stage;
  (iv) set the split backplane termination stage to corresponding to the particular backplane signal to its signal flow-through mode, wherein the split backplane termination stage couples the selected split backplane signal to the RF switch; and
  (v) set the remaining split backplane termination stages to their signal termination modes, wherein each of the split backplane termination stages couples its corresponding split backplane signal to ground through a termination resistor having an impedance equal to the internal signal impedance.

12. The RF router of claim 5 wherein each of the RF signal output stages includes an impedance matching stage that presents the internal signal impedance to the selected split backplane signal and the external signal impedance to the RF signal output terminal or to a circuit element coupled between the impedance matching stage and the RF signal output terminal.

13. The RF router of claim 5 wherein each of the RF signal output stages includes an output termination stage for selectively terminating the corresponding RF signal output terminal to ground or for coupling the selected split backplane signal to the RF signal output terminal under the control of the controller.

14. The RF router of claim 1 wherein the input module further comprises an automatic gain control stage coupled between each RF signal input terminal and the corresponding resistive input signal splitter.

15. The RF router of claim 1 further comprising a high isolation RF gain stage coupled between each resistive input signal splitter and each corresponding backplane signal output terminal.

16. The RF router of claim 15 further comprising a split input signal termination stage coupled between each resistive input signal splitter and each corresponding high isolation RF gain stage, wherein each split input signal termination stage is configurable to operate in a signal flow-through mode in which the split input signal termination stage couples the resistive input signal splitter to the corresponding to high isolation RF gain stage to permit a corresponding split input signal to reach the high isolation RF gain stage or in a signal termination mode in which the corresponding split input signal is terminated to ground through a termination resistor having an impedance equal to the internal signal impedance.

17. The RF router of claim 16 wherein the controller is coupled to each split input signal termination stage to switch the split input signal termination stage between the flow-through mode and the signal termination mode.

18. The RF router of claim 17 wherein each high isolation gain stage has an on state and an off state, and wherein the controller is coupled to each high isolation gain stage to switch the high isolation gain stage to its off state when the corresponding split input signal termination stage is in its signal termination mode and to switch the high isolation gain stage to its on state when the corresponding split input signal termination stage is in its signal flow-through mode.

19. The RF router of claim 17 wherein the controller is configured to switch each split input signal termination stage to its signal flow-through mode when the corresponding backplane signal is coupled to an output module and to switch each split input signal termination stage to its signal termination mode when the corresponding backplane signal is not coupled to an output module.

20. The RF router of claim 1 wherein each of the backplane signal paths has a path length selected to compensate for corresponding differences in a characteristic of a split backplane signals corresponding to the backplane signal path.

21. The RF router of claim 1 wherein each of the split backplane signals has a path length in the output modules and each of the backplane signal paths has a path length selected to compensate for corresponding differences in the path lengths of the corresponding split backplane signals.

* * * * *